United States Patent
Akiguchi et al.

(10) Patent No.: US 7,656,297 B2
(45) Date of Patent: Feb. 2, 2010

(54) RFID TAG READING RATE

(75) Inventors: Makiko Akiguchi, Tokyo (JP); Shohei Takeuchi, Tokyo (JP)

(73) Assignee: Nec Corporation, Tokyo (JP)

( * ) Notice: Subject to any disclaimer, the term of this patent is extended or adjusted under 35 U.S.C. 154(b) by 356 days.

(21) Appl. No.: 11/717,665

(22) Filed: Mar. 14, 2007

(65) Prior Publication Data
US 2007/0229280 A1   Oct. 4, 2007

(30) Foreign Application Priority Data
Mar. 15, 2006   (JP) .............................. 2006-070800

(51) Int. Cl.
*G08B 23/00*   (2006.01)
(52) U.S. Cl. ............... 340/572.7; 340/572.1; 340/10.1
(58) Field of Classification Search ............. 340/572.1, 340/572.7, 10.1, 10.2
See application file for complete search history.

(56) References Cited

U.S. PATENT DOCUMENTS 5,221,831 A *  6/1993  Geiszler ................ 235/440
6,218,942 B1 *  4/2001  Vega et al. ............. 340/572.1
2002/0107445 A1 *  8/2002  Govari .................. 600/437
2002/0149681 A1 * 10/2002  Kahn et al. ............ 348/211.99
2005/0159187 A1 *  7/2005  Mendolia et al. ....... 455/562.1

FOREIGN PATENT DOCUMENTS

| JP | 234914/1995 | 9/1995 |
| JP | 118037/2001 | 4/2001 |
| JP | 074279/2002 | 3/2002 |
| JP | 356227/2002 | 12/2002 |
| JP | 004532/2005 | 1/2005 |

* cited by examiner

*Primary Examiner*—Daniel Wu
*Assistant Examiner*—Ryan W Sherwin
(74) *Attorney, Agent, or Firm*—Young & Thompson

(57) ABSTRACT

An RFID system of the present invention has a plurality of antennas for reading data from an RFID tag; an antenna configuration storage unit for prestoring a position of each of the plurality of antennas; a position detection unit for detecting a position of the RFID tag; and an antenna control unit for selecting one or more of the antennas that read the RFID tag, based on the position of the RFID tag detected by the position detection unit and on the position of each of the plurality of antennas stored in the antenna configuration storage unit, and for preferentially activating the selected one or more of the antennas.

4 Claims, 6 Drawing Sheets

RFID TAG READING RATE

This application is based upon and claims the benefit of priority from Japanese Patent Application No. 2006-70800 filed on Mar. 15, 2006, the content of which is incorporated by reference.

BACKGROUND OF THE INVENTION

1. Field of the Invention

The present invention relates to a Radio Frequency Identification (RFID) system and an RFID reading method for reading data from an RFID tag.

2. Description of the Related Art

In recent years, it has become increasingly common to perform article management by attaching RFID tags on which data about articles is written, and reading data from those RFID tags. To ensure accurate article management, the requirement is that data must be accurately read from RFID tags.

Accordingly, as RFID systems for article management, multi-antenna systems that have a plurality of antennas for reading data from RFID tags have recently come into use (see JP-A-2002-074279 and JP-A-2002-356227). In addition, multi-reader systems that connect an RFID reader to each of the plurality of antennas are also beginning to be applied.

An RFID system having a plurality of antennas reads data from RFID tags by switching the antennas at regular intervals.

However, a problem is that the reading rate for RFID tags can decrease depending on the position of RFID tags attached to articles or the like.

SUMMARY OF THE INVENTION

It is therefore an object of the present invention to provide an RFID system and RFID reading method that can improve the reading rate for RFID tags.

An RFID system of the present invention is characterized in having:
a plurality of antennas for reading data from an RFID tag;
an antenna configuration storage unit for prestoring the position of each of the plurality of antennas;
a position detection unit for detecting the position of the RFID tag; and
an antenna control unit for selecting one or more of the antennas that read the RFID tag, based on the position of the RFID tag detected by the position detection unit and on the position of each of the plurality of antennas stored in the antenna configuration storage unit, and for activating the selected one or more of the antennas preferentially.

According to this configuration, it is possible to detect the position of an RFID tag and, based on the detected position, select an antenna optimal for reading the RFID tag, e.g., being close to the RFID tag, and to activate the antenna preferentially to read the RFID tag. Consequently, the reading rate for RFID tags can be improved in the RFID system as a whole.

Also, the antenna configuration storage unit may also prestore an inclination angle of each of the plurality of antennas;
the position detection unit may also detect an inclination angle of the RFID tag; and
the antenna control unit may also select one or more of the antennas that read the RFID tag, based on the position and inclination angle of the RFID tag detected by the position detection unit and on the position and inclination angle of each of the plurality of antennas stored in the antenna configuration storage unit, and may activate the selected one or more of the antennas preferentially.

According to the configuration, it is possible to detect the position and inclination angle of the RFID tag, and based on the detected position and inclination angle, select an antenna optimal for reading the RFID tag, e.g., being close to and facing the RFID tag, and activate that antenna preferentially to read the RFID tag. Thus, the reading rate for RFID tags can be further improved in the RFID system as a whole.

The position detection unit may also be a distance sensor for detecting the distance to the position of the RFID tag.

The position detection unit may also consist of,
an image taking unit for taking an image of the RFID tag; and
an image recognition unit for performing image recognition of an image of the RFID tag taken by the image taking unit to thereby measure the distance to the position of the RFID tag and the inclination angle of the RFID tag.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
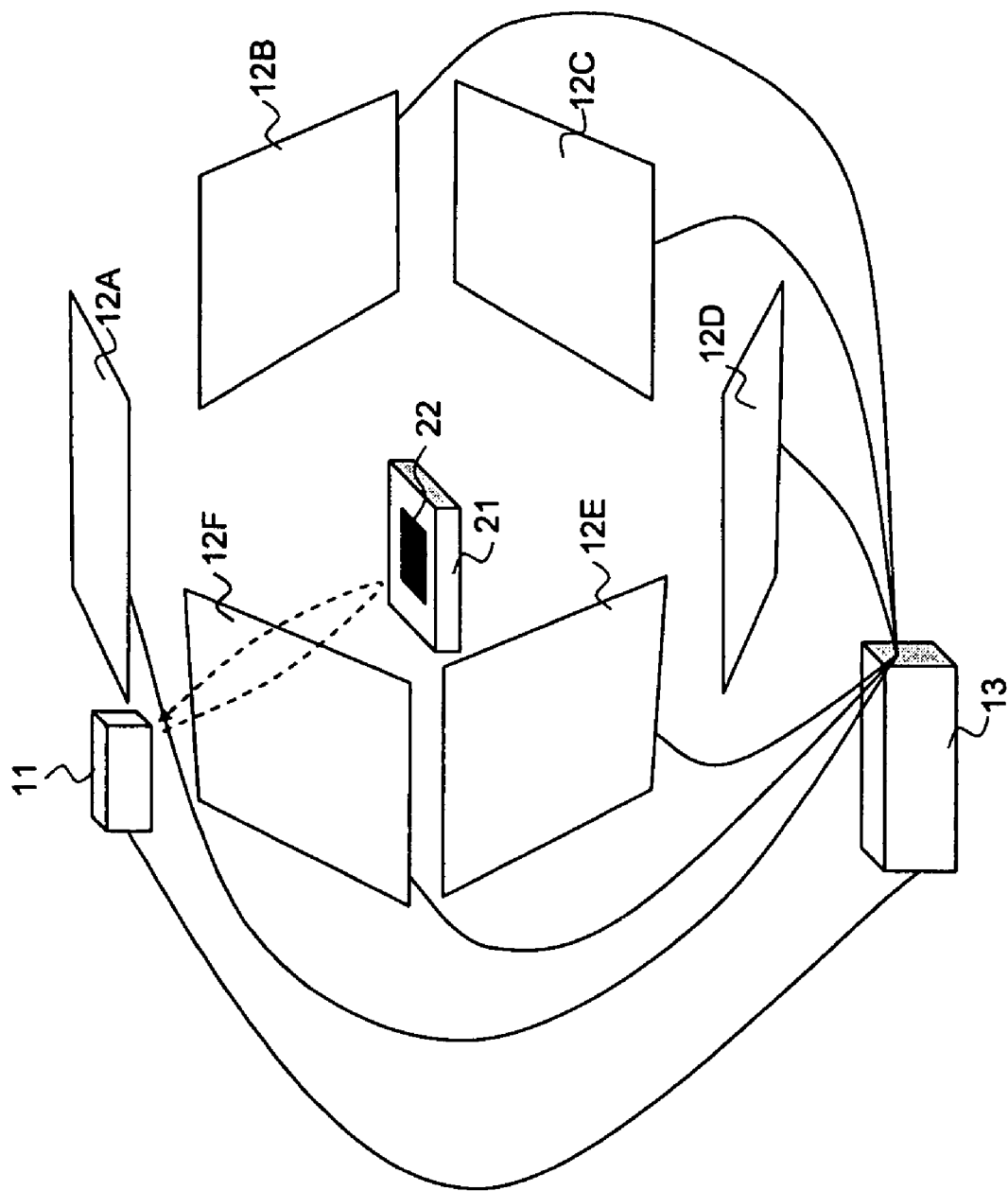
FIG. 1 shows the configuration of an RFID system according to a first embodiment of the present invention.

In the following, the best mode for practicing the present invention will be described with reference to drawings. In all drawings described below, similar components are given similar reference numerals and their descriptions are omitted as appropriate.

First Embodiment

FIG. 1 shows the configuration of an RFID system according to the first embodiment of the present invention.

Referring to FIG. 1, the RFID system of the embodiment includes distance sensor 11, a plurality of antennas 12A to 12F, and RFID reader 13.

Distance sensor 11 serves as a position detection unit for detecting the distance to the position of RFID tag 22 which is attached to article 21 and for outputting the detected value to RFID reader 13 as the result of position detection. This embodiment provides distance sensor 11 above article 21 assuming that RFID tag 22 is attached to the upper surface of article 21, so that distance sensor 11 detects the distance to the upper surface of article 21 and the detected value is assumed to be the distance to RFID tag 22.

Antennas 12A to 12F are installed in a loop around article 21 and read data from RFID tag 22 under control of RFID reader 13 and output the result of reading to RFID reader 13. Specifically, when activated by RFID reader 13, antennas 12A to 12F transmit a query wave to RFID tag 22 for reading data therefrom and receive data from RFID tag 22 as a response wave. Although six antennas 12A to 12F are illustrated in FIG. 1, the number of antennas is not particularly limited as long as it is plural.

RFID reader 13 selects one or more of antennas 12A to 12F that can read RFID tag 22, based on information on the distance to RFID tag 22 that is input as a result of position detection from distance sensor 11 and information on the antenna configuration (position and reading width) of each of antennas 12A to 12F, and activates the selected one or more of the antennas preferentially. Specifically, RFID reader 13 selects such an antenna that is close to RFID tag 22 and whose reading width covers the position of RFID tag 22 from among antennas 12A to 12F.

Figure 2:
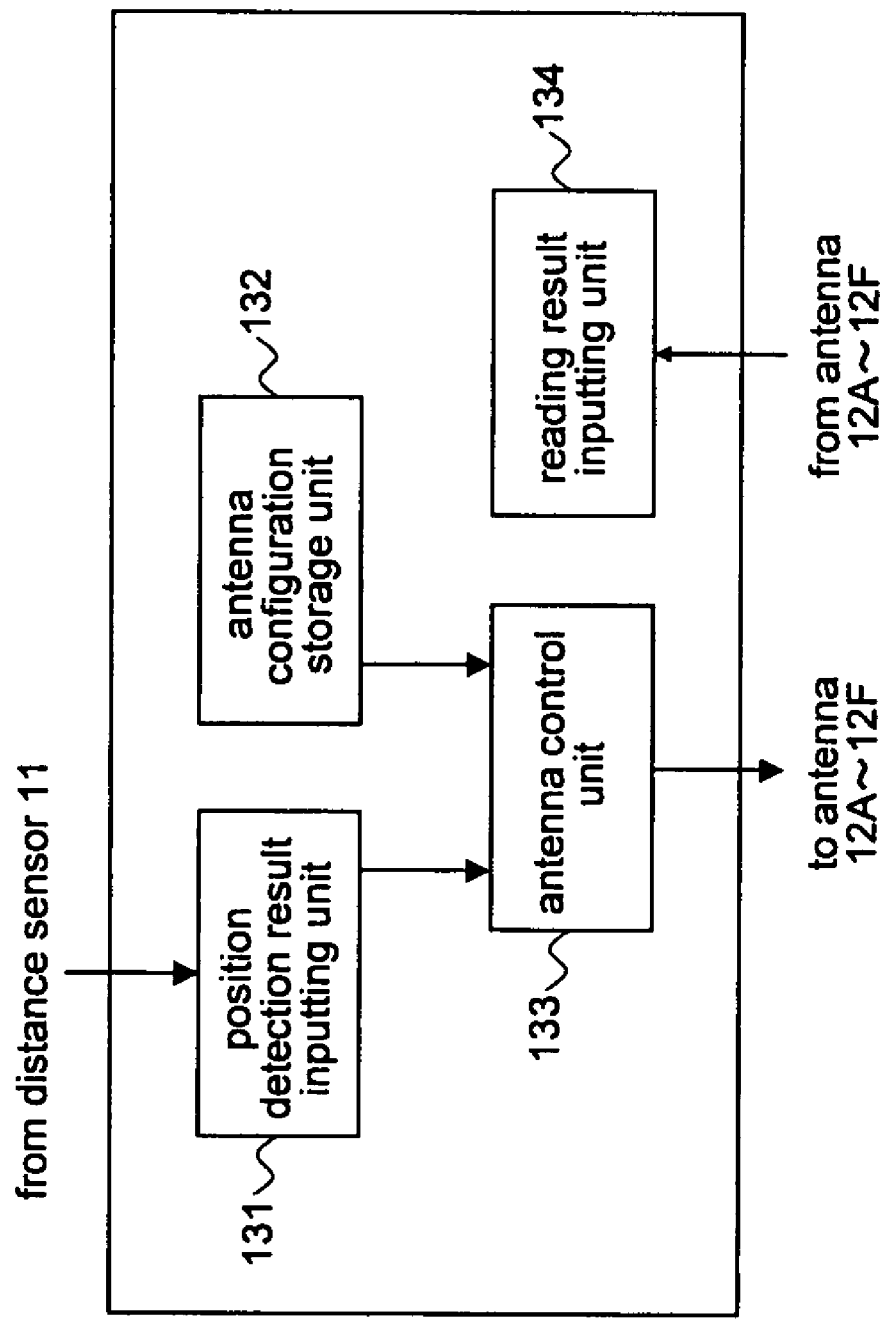
FIG. 2 shows the configuration of an RFID reader illustrated in FIG. 1.

FIG. 2 shows the configuration of RFID reader 13 shown in FIG. 1.

Referring to FIG. 2, RFID reader 13 of this embodiment includes position detection result inputting unit 131, antenna configuration storage unit 132, antenna control unit 133, and reading result inputting unit 134.

To position detection result inputting unit 131, information on the distance to RFID tag 22 is input from distance sensor 11 as a result of position detection.

Antenna configuration storage unit 132 prestores information on the antenna configuration of antennas 12A to 12F such as position, inclination angle, and reading width.

Antenna control unit 133 selects one or more of antennas 12A to 12F that can read RFID tag 22, based on information on the distance to RFID tag 22 which is input to position detection result inputting unit 131 and information on the antenna configuration (i.e., position and reading width) of antennas 12A to 12F that is stored in antenna configuration storage unit 132, and preferentially activates the selected one or more of the antennas.

The result of reading RFID tag 22 is input from each of antennas 12A to 12F to reading result inputting unit 134.

The operation of the RFID system according to this embodiment will be described below.

First, distance sensor 11 detects the distance to the upper surface of article 21 which has RFID tag 22 attached thereon and outputs the detected value to RFID reader 13 as a position detection result that indicates the distance to RFID tag 22.

In RFID reader 13, information on the distance to RFID tag 22 that has been output as a position detection result from distance sensor 11 is input to position detection result inputting unit 131 and output to antenna control unit 133. Antenna control unit 133 calculates a control method for selecting one or more antennas that can read RFID tag 22, based on information on the antenna configuration (i.e., position and reading width) of antennas 12A to 12F that is stored in antenna configuration storage unit 132 and on information on the distance to RFID tag 22 that is input to position detection result inputting unit 131, and preferentially activates the selected one or more of the antennas.

For example, assume that only one antenna 12D is selected that is close to RFID tag 22 and whose reading width covers the position of RFID tag 22. In this case, a control method for switching the antennas at regular intervals may be one that assigns antenna 12D as the first in a rotation (e.g., 12D→12E→12F→12A→12B→12C→12D . . . ), one that assigns the antenna 12D and other antennas alternately (e.g., 12D→12E→12D→12F→12D→12A→12D→12B→12D→12C→12D . . . ) or the like. This increases the number of reading attempts by antenna 12D.

Antenna control unit 133 activates antennas 12A to 12F based on the control method described above and has the antennas read data from RFID tag 22. Results of reading by antennas 12A to 12F are input to reading result inputting unit 134.

This embodiment assumes that RFID tag 22 is attached to the upper surface of article 21. However, RFID tag 22 may be attached at any position as long as it enables the distance to the upper surface of article 21 to be assumed as the distance to RFID tag 22, e.g., an upper portion of a side of article 21.

Second Embodiment

Figure 3:
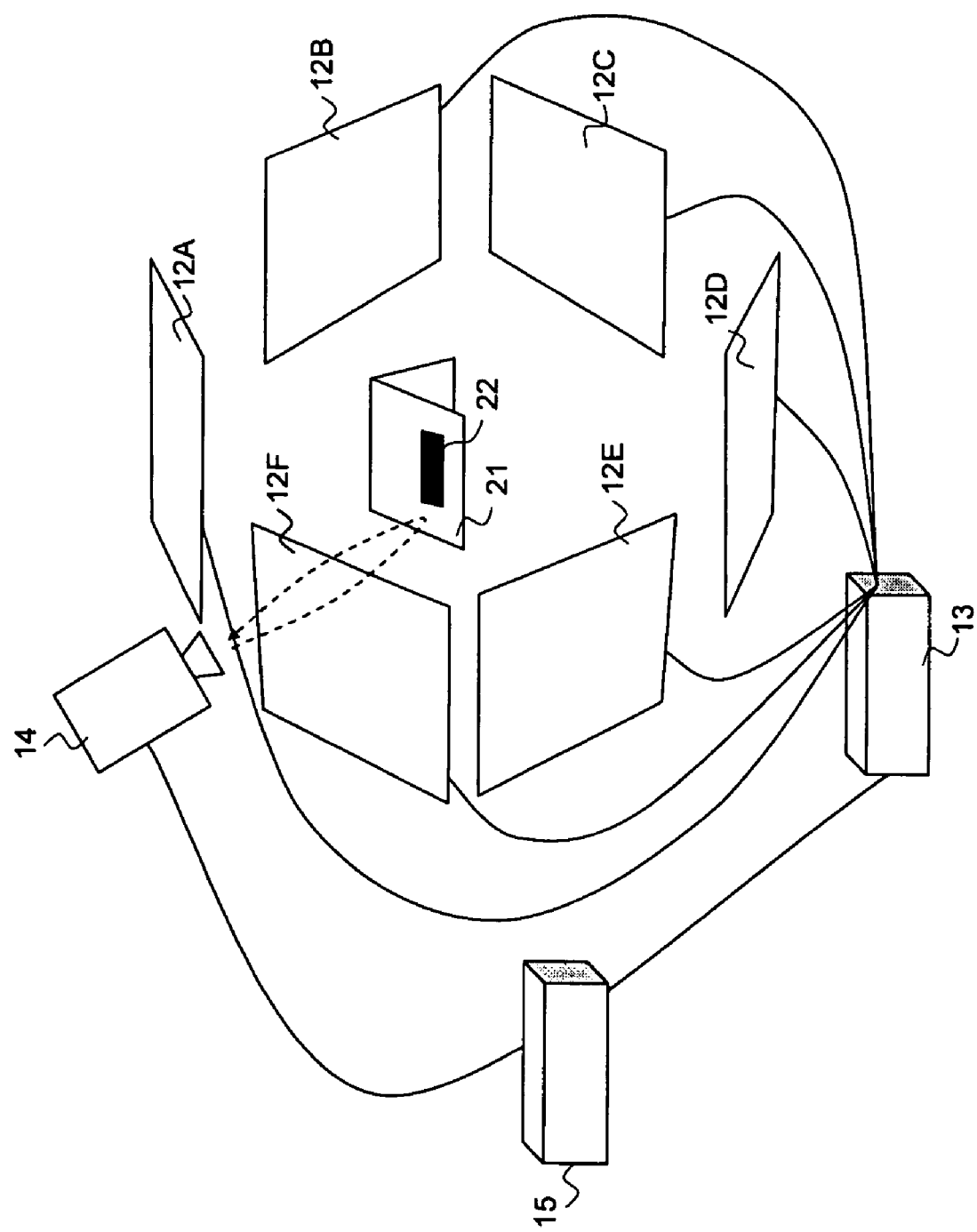
FIG. 3 shows the configuration of an RFID system according to a second embodiment of the present invention.

FIG. 3 shows the configuration of an RFID system according to the second embodiment of the present invention.

Referring to FIG. 3, the RFID system of this embodiment is different from the first embodiment shown in FIG. 1 in that it has camera 14 and image recognition unit 15 as the position detection unit instead of distance sensor 11.

Camera 14 serves as an image taking unit that takes an image of RFID tag 22 and outputs the taken image to image recognition unit 15. To take an image of RFID tag 22 reliably, it is preferable that two or more cameras 14 are provided so that an image of RFID tag 22 is taken from different angles by those cameras. However, when it is assumed that RFID tag 22 is attached at a fixed position, there may be only one camera 14 as long as camera 14 is positioned such that it can take an image of RFID tag 22 attached at the fixed position.

Image recognition unit 15 performs image recognition of an image of RFID tag 22 output from camera 14 to thereby measure the distance to RFID tag 22 and to measure the inclination angle of RFID tag 22 and outputs the measured values to RFID reader 13 as a result of position detection. Specifically, assuming that a mark of a certain size is attached to the surface of RFID tag 22, the mark indicates the distance to RFID tag 22 and the inclination angle of RFID tag 22. Image recognition unit 15 can thus measure the distance to RFID tag 22 and the inclination angle of RFID tag 22 utilizing the mark attached to the surface of RFID tag 22. Alternatively, image recognition unit 15 may employ a technique disclosed in paragraph [0022] of JP-A-H7-234914 to measure the distance to RFID tag 22 and to measure the inclination angle of RFID tag 22. That is, image recognition unit 15 binarizes image data of RFID tag 22 and removes micro noises from the binarized image data through a filtering processing, then labels the pixels of the white area. If the area of the labeled white area is within a predetermined range, it calculates the barycentric position of the white area. The barycentric position represents the distance to RFID tag 22 and the angle of RFID tag 22. Image recognition unit 15 is thus capable of measuring the distance to RFID tag 22 and the inclination angle of RFID tag 22 by utilizing the barycentric position of the white area.

RFID reader 13 selects one or more of antennas 12A to 12F that can read RFID tag 22, based on information on the distance to RFID tag 22 and the inclination angle of RFID tag 22 that is output from image recognition unit 15 as a result of position detection and information on the antenna configuration (i.e., position, inclination angle, and reading width) of antennas 12A to 12F, and preferentially activates the selected one or more of the antennas. Specifically, RFID reader 13 may select such an antenna that is close to RFID tag 22, faces RFID tag 22, and whose reading width covers the position of RFID tag 22 from among antennas 12A to 12F. For example, when RFID tag 22 is inclined at an angle as illustrated in FIG. 3, RFID reader 13 selects antenna 12F which is close to RFID tag 22 and which faces RFID tag 22.

Figure 4:
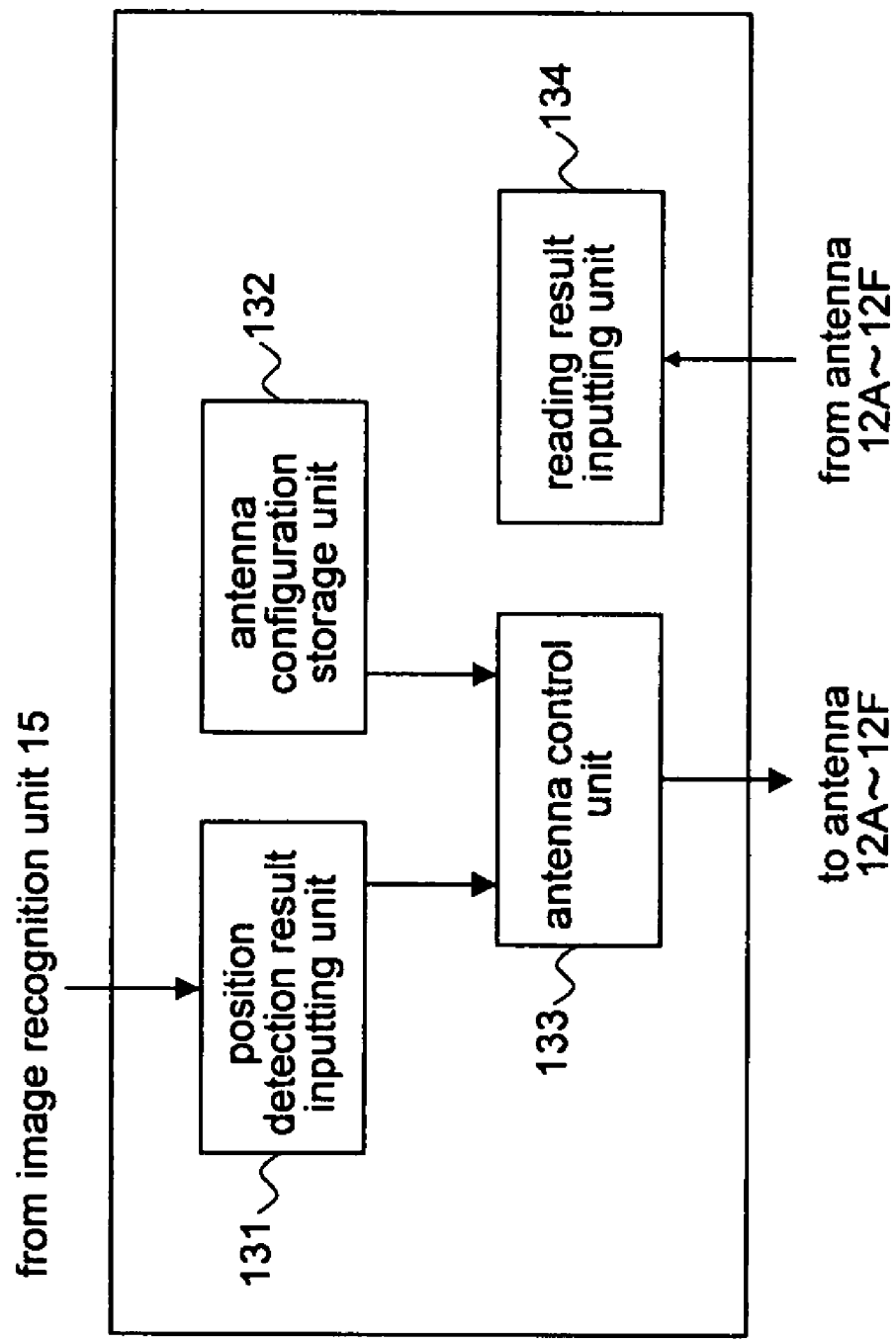
FIG. 4 shows the configuration of the RFID reader illustrated in FIG. 3.

FIG. 4 shows the configuration of RFID reader 13 illustrated in FIG. 3.

Referring to FIG. 4, RFID reader 13 of this embodiment differs from the configuration shown in FIG. 2 in that position detection result inputting unit 131 inputs information on the distance to RFID tag 22 and on the inclination angle of RFID tag 22 as a result of position detection from image recognition unit 15 and in that antenna control unit 133 selects one or more antennas that will be activated preferentially, based on the information on the distance to RFID tag 22, on the inclination angle of RFID tag 22 and information on the antenna configuration (i.e., position, inclination angle, and reading width) of antennas 12A to 12F.

Except for the configuration and operations described above, this embodiment is similar to the first embodiment.

Third Embodiment

Figure 5:
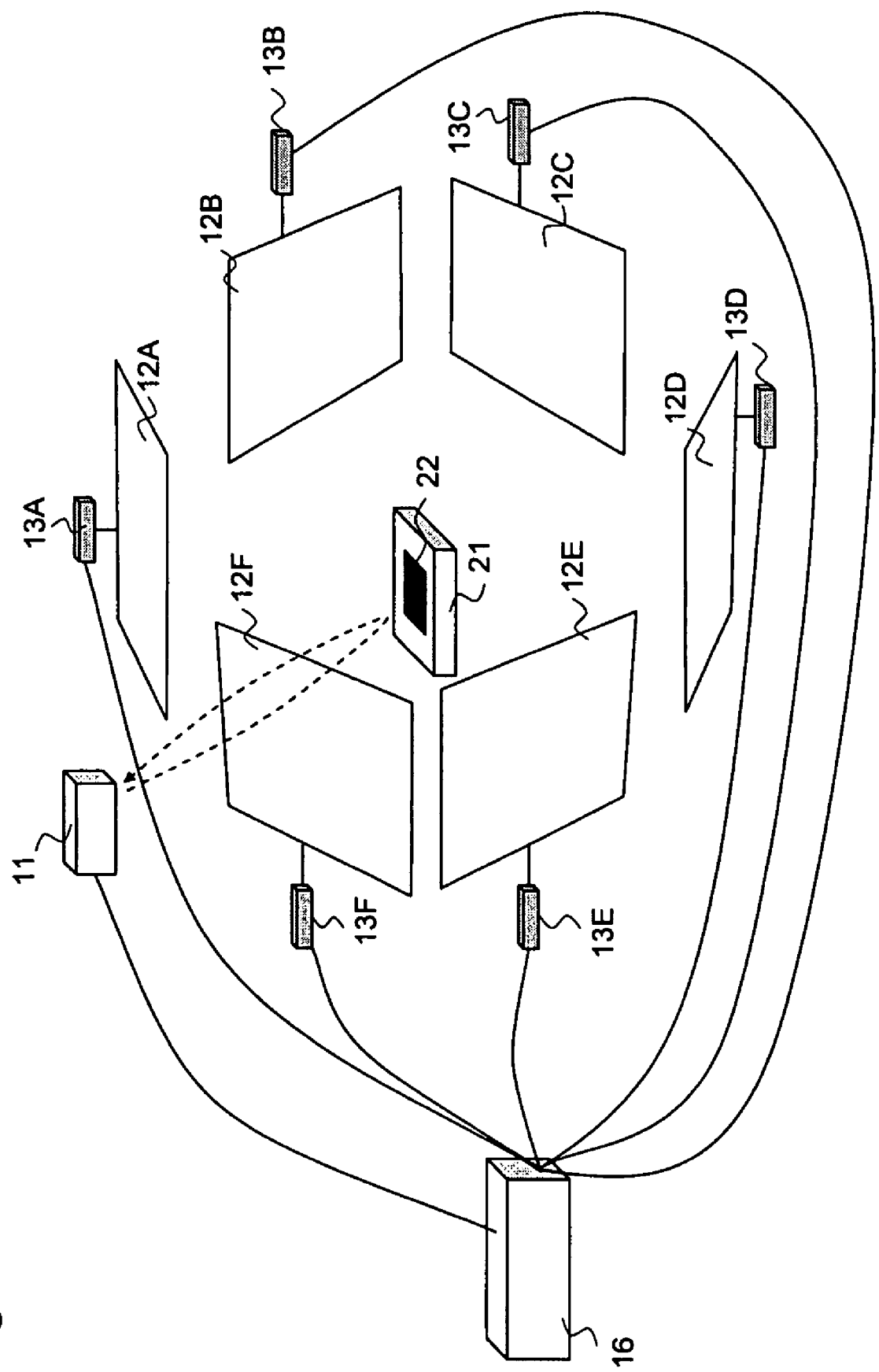
FIG. 5 shows the configuration of an RFID system according to a third embodiment of the present invention.

FIG. 5 shows the configuration of an RFID system according to the third embodiment of the present invention.

Referring to FIG. 5, the RFID system of this embodiment is different from the first embodiment shown in FIG. 1 in that it has RFID readers 13A to 13F which are connected to antennas 12A to 12F respectively and multi-reader control unit 16 which is connected to RFID readers 13A to 13F to control RFID readers 13A to 13F.

The result of reading RFID tag 22 by antennas 12A to 12F is input to RFID readers 13A to 13F, respectively.

The configuration of multi-reader control unit 16 is similar to that of RFID reader 13 shown FIG. 2 with the antennas replaced with RFID readers.

Except for the above-described configuration and operations, this embodiment is similar to the first embodiment.

Fourth Embodiment

Figure 6:
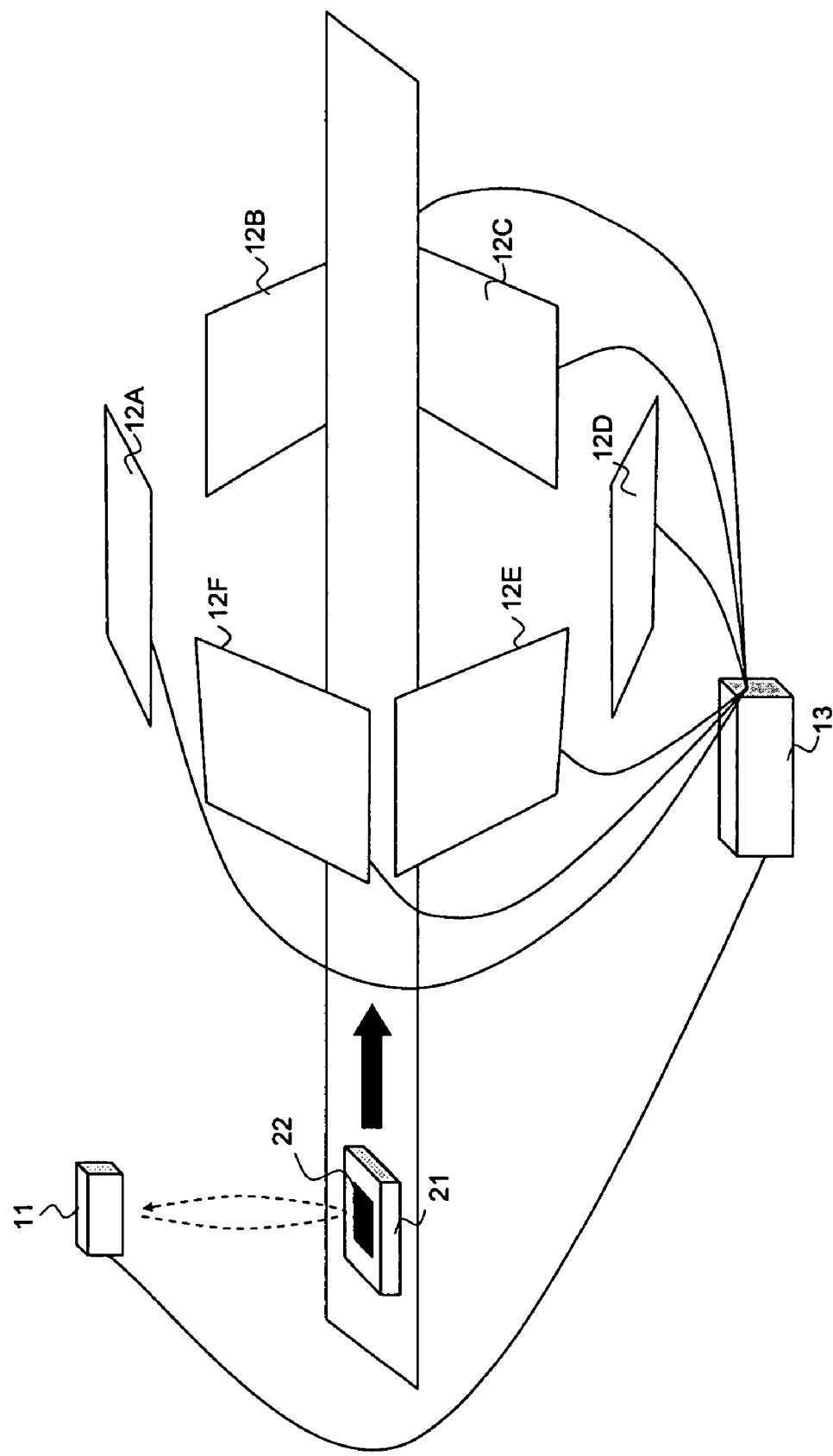
FIG. 6 shows the configuration of an RFID system according to a fourth embodiment of the present invention.

FIG. 6 shows the configuration of an RFID system according to the fourth embodiment of the present invention.

Referring to FIG. 6, the RFID system of this embodiment differs from the configuration of the first embodiment shown in FIG. 1 in that article 21 to which RFID tag 22 is attached moves in the direction indicated by the arrow, e.g., on a belt conveyer, and that distance sensor 11 is positioned upstream to the position of antennas 12A to 12F in terms of the moving direction of article 21.

In this embodiment, before article 21 reaches the location where antennas 12A to 12F are positioned, the distance to the upper surface of article 21 is detected by distance sensor 11 and one or more of antennas 12A to 12F that should be activated preferentially are selected.

Except for the above-described configuration and operations, this embodiment is similar to the first embodiment.

While preferred embodiments of the present invention have been described using specific terms, such description is for illustrative purposes only, and it is to be understood that changes and variations may be made without departing from the spirit or scope of the following claims.

What is claimed is:

1. An RFID system, comprising:
   a plurality of antennas arranged in a single orbital plane for reading data from an RFID tag;
   an antenna configuration storage unit for prestoring the position of each of the plurality of antennas;
   a position detection unit for detecting the position of the RFID tag; and
   an antenna control unit for selecting one or more of the antennas that read the RFID tag, based on the position of the RFID tag detected by the position detection unit and the position of each of the plurality of antennas stored in the antenna configuration storage unit, and for preferentially activating the selected one or more of the antennas,
   wherein, the antenna configuration storage unit also prestores an inclination angle of each of the plurality of antennas;
   the position detection unit also detects an inclination angle of the RFID tag; and
   the antenna control unit selects one or more of the antennas that read the RFID tag, based on the position and inclination angle of the RFID tag detected by the position detection unit and on the position and inclination angle of each of the plurality of antennas stored in the antenna configuration storage unit, and preferentially activates the selected one or more of the antennas.

2. The RFID system according to claim 1, wherein the position detection unit is a distance sensor that detects the distance to the position of the RFID tag.

3. The RFID system according to claim 1, wherein the position detection unit consists of:
   an image taking unit for taking an image of the RFID tag; and
   an image recognition unit for performing image recognition of an image of the RFID tag taken by the image taking unit to thereby measure the distance to the position of the RFID tag and the inclination angle of the RFID tag.

4. An RFID reading method for an RFID system that reads data from an RFID tag by means of a plurality of antennas arranged in a single orbital plane, the method comprising:
   a storage step of prestoring a position of each of the plurality of antennas;
   a position detection step of detecting a position of the RFID tag; and
   a control step of selecting one or more of the antennas that read the RFID tag, based on the position of the RFID tag detected at the position detection step and on the position of each of the plurality of antennas that is stored at the storage step, and of preferentially activating the selected one or more of the antennas,
   wherein the storage step also prestores an inclination angle of each of the plurality of antennas;
   the position detection step also detects an inclination angle of the RFID tag; and
   the control step selects one or more of the antennas that read the RFID tag, based on the position, on the inclination angle of the RFID tag detected at the position detection step and on the position and inclination angle of each of the plurality of antennas stored at the storage step, and preferentially activates the selected one or more of the antennas.

* * * * *